United States Patent [19]
Chevallier

[11] Patent Number: 6,107,226
[45] Date of Patent: Aug. 22, 2000

[54] PRECIPITATED SILICA BEADS

[75] Inventor: Yvonick Chevallier, Decines, France

[73] Assignee: Rhone-Poulenc Chimie, Courbevoie Cedex, France

[21] Appl. No.: 07/517,719

[22] Filed: May 2, 1990

[30] Foreign Application Priority Data

May 2, 1989 [FR] France .................................. 89 05812

[51] Int. Cl.[7] .................................................. C04B 35/14
[52] U.S. Cl. .......................................... 501/133; 423/339
[58] Field of Search ..................................... 423/335, 339; 501/33, 54, 154, 133; 502/8, 16

[56] References Cited

U.S. PATENT DOCUMENTS

| | | | |
|---|---|---|---|
| 3,383,172 | 5/1968 | Biegler et al. | 423/335 |
| 3,669,624 | 6/1972 | Warthen et al. | 423/335 |
| 3,923,533 | 12/1975 | Hammel et al. | 501/33 |
| 4,508,607 | 4/1985 | Winyall | 423/335 |
| 4,704,374 | 11/1987 | Jacques | 423/335 |
| 4,738,838 | 4/1988 | Shinpo et al. | 423/339 |
| 4,778,667 | 10/1988 | Garvey et al. | 423/335 |

FOREIGN PATENT DOCUMENTS 0018866  11/1980  European Pat. Off. .

OTHER PUBLICATIONS

*Chemical Abstracts*, "Manufacture of Inorganic Oxide Powders", vol. 106, No. 18, Reference No. 140518g, p. 128, May 4, 1987.

*Primary Examiner*—George Fourson
*Attorney, Agent, or Firm*—Burns, Doane, Swecker & Mathis, L.L.P.

[57] ABSTRACT

Essentially spherical precipitated silica beads, well adapted for the reinforcement of elastomeric matrices, have a mean particle size of at least 80 $\mu$m, a BET specific surface area ranging from 60 to 130 $m^2/g$, a fill density in packed state ranging from 0.28 to 0.37, and a total pore volume ranging from 1.6 to 3.3 $cm^3/g$.

19 Claims, No Drawings

PRECIPITATED SILICA BEADS

BACKGROUND OF THE INVENTION

1. Field of the Invention

The present invention relates to novel precipitated silica particulates, to a process for the preparation thereof, and to the use of such novel silica particulates as a reinforcing material for elastomeric matrices.

2. Description of the Prior Art

It is known to this art that precipitated silica is a useful reinforcing filler for elastomeric matrices.

However, as with any reinforcing filler, it must be easily manipulated and readily incorporated into the material to be reinforced.

Silica typically exists in the form of a powder. However, such powder form is not completely satisfactory in that it generates large amounts of dust and is incorporated into the matrix only slowly (low apparent density).

For this reason, silica in granulated form has been proposed to the art, which conveniently resolves the aforementioned problems, but which frequently results in an insufficient dispersion of the filler in the elastomers and provides a lesser degree of reinforcement relative to a filler in the powder form.

To obviate this disadvantage, EP 18,866, assigned to the assignee hereof, proposed certain homogeneous silica spheres having a mean particle size greater than 80 μm, a BET surface area of 100 to 300 $m^2/g$ and a density of approximately 0.29.

This type of silica material has been found to be particularly advantageous in light of its elastomer reinforcing properties.

However, there is an existing need in this art to still further improve these materials relative to one or more of their characteristics/properties. For example, need continues to exist for silica particulates which are well dispersed in elastomers and, in particular, have a higher density.

SUMMARY OF THE INVENTION

Accordingly, a major object of the present invention is the provision of novel silica particulates having a highly specific morphology, i.e., in the form of beads, which novel silica beads are not only well dispersed in elastomers but also enhance the properties of such elastomers.

Briefly, in a first embodiment, the present invention features novel silica particulates in the form of essentially spherical beads having a mean particle size of at least 80 μm, a maximum BET specific surface area of 130 $m^2/g$, a fill density in the packed state (DRT) greater than 0.32, and a total pore volume of at least 1.6 $cm^3/g$.

In a second embodiment of the invention, the novel silica particulates are in the form of essentially spherical beads having a mean particle size of at least 80 μm, a BET surface ranging from 100 to 130 $m^2/g$, a density ranging from 0.28 to 0.32, and a total pore volume ranging from 1.6 to 3.3 $cm^3/g$.

In a third embodiment of the invention, the silica particulates are in the form of essentially spherical beads having a mean particle size of at least 80 μm, a BET surface of less than 100 $m^2/g$ and a density ranging from 0.28 and 0.32.

This invention also features a process for the production of such novel silica beads, comprising providing a silica suspension by reacting a silicate with an acidifying agent and then precipitating same, followed by the drying by atomization of such suspension, and wherein the precipitation is carried out according to the following sequence:

(i) a base mixture is first prepared, containing at least a portion of the total amount of the silicate required for the reaction and an electrolyte;

(ii) adding the acidifying agent to such base mixture until a pH of about 7 is obtained;

(iii) optionally, adding any additional acidifying agent and the remaining amount of the silicate to the reaction medium; and (iv) drying the resulting suspension which has a dry solids content of at least 18% by weight and a pH of at least 4.

DETAILED DESCRIPTION OF THE PREFERRED EMBODIMENTS OF THE INVENTION

More particularly according to the present invention, it will be appreciated that the subject silica particulates are in the form of balls or beads. These beads are essentially spherical.

The silica beads of the invention have a mean particle size of at least 80 μm.

In one preferred embodiment of the invention, this mean particle size is at most 300 μm. In other embodiments of the invention, the mean particle size is greater than 100 μm, in particular 150 μm and preferably ranges from 100 to 250 μm. This mean particle size is determined according to the standard NF X 11507 (December 1970) by dry screening and measuring the corresponding diameter on a cumulative residue of 50%.

Another characteristic of the silica beads of the invention is their BET surface. The BET specific surface area is determined by the BRUNAUER-EMMET-TELLER method described in *Journal of the American Chemical Society*, Vol. 60, page 309 (February 1938) and by the standard NFT 45007 (November 1987) (5.11.2).

The BET specific surface is at most 130 $m^2/g$ according to the first embodiment of the invention. It ranges from 100 to 130 $m^2/g$ in the second embodiment and is less than 100 $m^2/g$ in the third embodiment.

According to particular variants of the invention, in the first embodiment the BET surface is less than 100 $m^2/g$ and in the first and third embodiments, this specific surface is at most 95 $m^2/g$, typically is at least 50 $m^2/g$ and in particular ranges from 60 to 90 $m^2/g$.

The silica beads of the invention have a total pore volume of at least 1.6 $cm^3/g$ and more preferably at least 1.8 $cm^3/g$.

It may, in particular, be greater than 2 and preferably ranges from 2.4 to 3.3 $cm^3/g$. Specifically referring to said second embodiment, it is equal to at most 3.3 $cm^3/g$, this upper limit being preferred in the first and third embodiments.

The pore volumes provided herein are measured by mercury porosimetry, the pore diameters being calculated by the WASHBURN equation with a contact angle of theta=130° and a surface tension of gamma=484 dynes/cm.

The porosity measurements are carried out on materials dried at 150° under a pressure of 1 Pa. The porosities given relate to pores having diameters ranging from 10μ to 0.001μ.

An important property of the silica beads of the invention is their density. Typically, their fill density in the packed state (DRT) is at least 0.28 and may be as high as 0.37.

In the embodiment of the invention, the density of the beads is higher than 0.32, more particularly is at least 0.33 and thus may range from 0.33 to 0.37.

This density is measured by the standard NFT No. 030100.

Another characteristic of the silica beads of the invention is their oil uptake, DOP. It typically is at most 270 ml/100 g.

According to the embodiments of the invention, the DOP uptake is at most 250 ml/100 g, more particularly 215 ml/g, specifically in the second embodiment, and it may, for example, range from 180 to 215 ml/100 g.

The DOP uptake is determined by the NFT Standard 30-022 (March '53) using dioctylphthalate.

An additional property of the silica beads of the invention is their CTAB specific surface area. Typically, this is at most 130 $m^2/g$, more particularly is equal to or less than 100 $m^2/g$ and preferably is equal to or less than 90 $m^2/g$.

The CTAB surface is the external surface area determined by the NFT Standard 45007 (5.12) (November 1987).

In another embodiment of the invention, the silica beads display a BET/CTAB surface ratio ranging from 0.9 to 1.2.

The process of the preparation of the silica beads described above will now be more fully described.

The process is characterized by two specific principal stages: precipitation and drying.

It will be appreciated that the process of the invention is one for the synthesis of precipitated silica, i.e., one in which an acidifying agent is reacted with a silicate.

The acidifying agent and the silicate are selected in known manner. In general, a strong inorganic acid, such as sulfuric acid, nitric acid or hydrochloric acid, or an organic acid, such as acetic acid, formic acid, carbonic acid, is used.

With respect to the silicate, any common form of silicates may be used, such as metasilicates, disilicates and, advantageously, an alkali metal silicate, in particular sodium or potassium silicate.

In the process of the invention, the precipitation is carried out in a specific manner, according to the following stages:

Initially, a base mixture is formed, which contains silicate and an electrolyte. The amount of silicate present in the base mixture may be the entire amount required for the reaction, or it may be only a portion of such total amount.

As regards the electrolyte, this term is used in its normal sense, i.e., it signifies any substance, ionic or molecular, which, when in solution, decomposes or dissociates to form ions or charged particles.

Preferably, the electrolyte is a salt of an alkali or alkaline earth metal, more preferably the salt of the metal of the starting material silicate and of the acidifying agent, for example sodium sulfate in the case of the reaction of a sodium silicate with sulfuric acid.

Advantageously, the electrolyte concentration ranges from 0.05 to 0.7 mole of salt per liter of the reaction volume in the case in which the salt (or electrolyte) is an alkali metal salt, and ranges from 0.001 to 0.01 mole per liter of the salt, if the electrolyte is a salt of an alkaline earth metal.

The second stage entails adding the acidifying agent to the base mixture described above.

This addition, which involves a correlative lowering of the pH of the reaction medium, is continued until a pH value of about 7 is attained, which pH generally ranges from 7 to 8.

Once this value is attained, and if the base mixture contains only a portion of the total amount of silicate required, additional acidifying agent and the remaining amount of the silicate is then simultaneously added thereto.

The precipitation reaction proper is terminated when all of the silicate has been added.

It is advantageous, at the end of the precipitation, and in particular after the aforementioned simultaneous addition, to age the reaction medium, for example for 10 minutes to 1 hour.

It is also possible in all cases, after the precipitation, to add in an optional later stage, an additional amount of the acidifying agent. This addition is generally continued until a pH of about 3 to 6.5 is attained.

The temperature of the reaction medium is that typically used for this type of process and, for example, ranges from 60° to 95° C.

Upon completion of the above operations, a slurry is obtained, which is then filtered and washed. Filtering may be carried out by any suitable method, for example on a filter press, or on a belt filter, or in a vacuum.

The other characteristic stage of the process of the invention is the drying step.

Drying is carried out under very specific conditions, relative to the nature of the suspension and to the type of drying carried out, i.e., atomization.

First respecting the suspension itself, it must have a certain number of characteristics, which must exist immediately prior to drying.

The suspension must be enriched in dry solids, namely, it must have a dry solids content of at least 18%, in particular at least 20% and preferably at least 25%.

This dry solids content may be provided directly by filtration, using a suitable filter yielding a filter cake having a high dry solids content. Another technique entails, after filtration and in a later stage of the process, adding dry solids to the cake, for example silica in powder form, such as to provide the necessary content.

It will be appreciated, as is well known to this art, that the filter cake produced in this manner is not suitable for atomization because of its high viscosity.

Thus, in known manner, the filter cake is subjected to a disintegrating operation. This operation may be carried out by transporting the cake through a grinder of the colloidal or ball type. Furthermore, in order to lower the viscosity of the suspension to be atomized, it is possible to add aluminum in the form of sodium aluminate, by a process described in FR-A-2,536,380, hereby incorporated by reference. This addition may be effected, in particular, at the instant of disintegration.

Another property that the suspension must have prior to drying is a particular pH. The pH must be at least 4, preferably at least 4.5 and more preferably it ranges from 5 to 7.

Another characteristic of the drying stage is its nature itself. As indicated above, drying by atomization is required.

Any suitable type of atomizer may be used, preferably nozzle, liquid pressure or two fluid atomizers.

The product obtained in this manner is particularly suitable for the reinforcement of elastomers. Moreover, it generates but little dust and exhibits good pourability.

In order to further illustrate the present invention and the advantages thereof, the following specific examples are given, it being understood that same are intended only as illustrative and in nowise limitative.

EXAMPLE 1

Into a stainless steel reactor, equipped with a propeller agitator and a double-wall heating system, an aqueous solution containing 700 l water, 19 kg $Na_2SO_4$ and 323 l aqueous sodium silicate was introduced. The characteristics of the aqueous sodium silicate were as follows: weight ratio of $SiO_2/Na_2O=3.45$, density at 20° C. of 1.230.

The mixture, which was the base mixture, was heated to 94° C. while maintained under agitation. 395 l sulfuric acid, diluted to a density at 20° C. of 1.050, were introduced until a pH of the reaction medium (measured at temperature) of 7.5 was attained. Subsequently, 109 l of the same acid were introduced, together with 83 l aqueous sodium silicate of the type described above. This simultaneous introduction of the acid and the silicate was carried out in a manner such that the pH of the reaction medium during this period was equal to 7.5±0.1. Following the introduction of all of the silicate, the addition of dilute acid was continued at a rate of 217 l/h for an additional 7 minutes. After this addition, the pH was equal to 4.

The overall duration of the reaction was set at 85 minutes.

The silica slurry obtained in this manner was filtered and washed using a filter press.

A silica cake exhibiting an ignition weight loss of 74% was obtained.

This cake was then fluidized by mechanical and chemical means (introduction of sodium aluminate). Following this disintegrating operation, a pumpable cake having a pH of 6 was obtained. The cake was then atomized using a nozzle atomizer.

The characteristics of the resulting dried silica were as follows:

| (i) | pH | = 6.5 (according to NFT 45007 of November, 1987); |
|---|---|---|
| (ii) | Ignition weight loss at 900° C. | = 10.5; |
| (iii) | DRT | = 0.310; |
| (iv) | D.O.P. oil uptake | = 251 ml/100 g $SiO_2$; |
| (v) | Specific BET surface | = 90 m²/g; |
| (vi) | Specific CTAB surface | = 84 m²/g; |
| (vii) | Total pore volume | = 2.95 cm³/g. |

The mean particle size was 220 µm.

EXAMPLE 2

The cake and the dried silica prepared in Example 1 were used. On a divided cake (ignition weight loss of 74%) maintained under agitation, a sufficient amount of dried silica was introduced to provide an ignition weight loss of 72%. The pH of the cake prior to drying was established at 6.1.

Thereafter, the cake was dried using an atomizer with nozzles. The characteristics of the dried silica were as follows:

| (i) | pH | = 6.6; |
|---|---|---|
| (ii) | Ignition weight loss at 900° C. | = 9% |
| (iii) | DRT | = 0.347; |
| (iv) | D.O.P. oil uptake | = 200 ml/100 g $SiO_2$; |
| (v) | Specific BET surface | = 90 m²/g; |
| (vi) | Specific CTAB surface | = 83 m²/g; |
| (vii) | Total pore volume | = 2.70 cm³/g. |

The mean particle size was 235 µm.

EXAMPLE 3

The procedure of Example 1 was repeated, but with the following differences:

(a) the bottom mixture was constituted of 689 l water, 19 kg $N_2SO_4$ and 334 l aqueous sodium silicate;

(b) the base mixture was heated to 89° C.;

(c) the acid was introduced into the base mixture which was maintained at 89° C.; 30 minutes after the onset of the first acid introduction, the temperature was increased to 93° C.;

(d) the introduction of the acid was discontinued 11 minutes after the completion of the simultaneous addition of the acid and the silicate;

(e) the total duration of the reaction was 88 minutes.

The silica slurry obtained from the reaction medium was then filtered on a filter press. The resulting filter cake had an ignition weight of 76%.

The cake was fluidized (its pH was 5.9), then atomized as in Example 1. The characteristics of the dried silica were as follows:

| (i) | pH | = 6.5; |
|---|---|---|
| (ii) | Ignition weight loss at 900° C. | = 6.3; |
| (iii) | DRT | = 0.30; |
| (iv) | D.O.P. oil uptake | = 246 ml/100 g $SiO_2$; |
| (v) | Specific BET surface | = 100 m²/g; |
| (vi) | Specific CTAB surface | = 93 m²/g; |
| (vii) | Total pore volume | = 3.05 cm³/g. |

The mean particle size was 180 µm.

EXAMPLE 4

Precipitation was carried out as in Example 1, with the following differences:

(a) the base mixture was constituted of an aqueous sodium sulfate solution containing 800 l water and 23.6 kg $Na_2SO_4$ and 223 l aqueous sodium silicate;

(b) to the resulting base mixture, heated to 95° C., 263 l dilute sulfuric acid were added;

(c) in an additional stage, 77 l of the same dilute acid and 55 l aqueous sodium silicate were simultaneously introduced.

Upon completion of the reaction, the pH was equal to 5.2. The total duration of the reaction was 90 minutes.

The silica slurry was filtered on a filter press, and the filter cake obtained had an ignition weight loss of 73.3% and a pH of 6 after disintegration; a fraction of the disintegrated cake was dried by atomization.

The dried silica obtained was added to the remaining disintegrated cake.

The dry silica obtained had an ignition weight loss of 71% and a pH of 6.1. After drying using a nozzle atomizer, a dry silica was obtained having the following characteristics:

| | | |
|---|---|---|
| (i) | pH | = 6.5; |
| (ii) | Ignition weight loss at 900° C. | = 9.7; |
| (iii) | DRT | = 0.36 ; |
| (iv) | D.O.P. oil uptake | = 182 ml/100 g $SiO_2$; |
| (v) | Specific BET surface | = 72 m$^2$/g; |
| (vi) | Specific CTAB surface | = 67 m$^2$/g; |
| (vii) | Total pore volume | = 2.55 cm$^3$/g. |

The mean particle size was 240 μm.

EXAMPLE 5

Precipitation was carried out as in Example 1, with the following differences:

(a) the temperature of the reaction was 95° C.;

(b) the introduction of the acid was discontinued 5 minutes after completion of the simultaneous addition of the acid and the silicate;

(c) upon completion of the reaction, the pH was equal to 5.

The resulting silica slurry was filtered on a filter press; the cake obtained had an ignition weight loss of 74%.

The cake was disintegrated.

A fraction of the disintegrated cake was dried by atomization.

The dry silica obtained was added to the other fraction of the disintegrated cake such as to provide a disintegrated cake having an ignition weight loss of 71% and a pH of 6.2. After drying using a nozzle atomizer, a dry silica was produced having the following characteristics:

| | | |
|---|---|---|
| (i) | pH | = 6.6; |
| (ii) | Ignition weight loss at 900° C. | = 9; |
| (iii) | DRT | = 0.35 ; |
| (iv) | D.O.P. oil uptake | = 200 ml/100 g $SiO_2$; |
| (v) | Specific BET surface | = 80 m$^2$/g; |
| (vi) | Specific CTAB surface | = 73 m$^2$/g; |
| (vii) | Total pore volume | = 2.60 cm$^3$/g. |

The mean particle size was 245 μm.

EXAMPLE 6

Precipitation was carried out as in Example 1, with the following differences:

(a) the base mixture was constituted of an aqueous sodium sulfate solution containing 800 l water and 27.5 kg $Na_2SO_4$ and 223 l aqueous sodium silicate;

(b) the reaction temperature was 95° C.;

(c) to the resulting base mixture, heated to 95° C., 269 l sulfuric acid were added;

(d) in a next stage, 77 l of acid and 55 l aqueous sodium silicate were simultaneously introduced;

(e) upon completion of the reaction, the pH was equal to 5.2.

The silica slurry obtained was filtered on a filter press; the resulting cake had an ignition weight loss of 72.5%.

The cake was disintegrated. The disintegrated slurry had a pH of 6 and was dried using a nozzle atomizer. A silica was produced having the following characteristics:

| | | |
|---|---|---|
| (i) | pH | = 6.5; |
| (ii) | Ignition weight loss at 900° C. | = 8.3; |
| (iii) | DRT | = 0.33 ; |
| (iv) | D.O.P. oil uptake | = 209 ml/100 g $SiO_2$; |
| (v) | Specific BET surface | = 63 m$^2$/g; |
| (vi) | Specific CTAB surface | = 60 m$^2$/g; |
| (vii) | Total pore volume | = 2.72 cm$^3$/g. |

The mean particle size was 235 μm.

EXAMPLE 7

This example relates to incorporating the silica produced in Example 2 in commercial rubber formulation.

The following two formulations were prepared (parts by weight):

| Formulation | A | B |
|---|---|---|
| Vistalon 808 (EPDM monomer, ethylene propylenediene) | 100 | 100 |
| EVA UL 00218 Ethylene vinyl acetate | 200 | 200 |
| SILOX 85 (peroxide) | 1.5 | 1.5 |
| Silica $S_1$ | 50 | 0 |
| Silica $S_2$ | 0 | 50 |

$S_1$ was a silica prepared in accordance with Example 1.

S2 was a silica of the prior art, described in EP 18,866. This silica had a BET surface of 185 m$^2$/g, a CTAB surface of 175 m$^2$/g, a DRT density of 0.25, a mean particle size of 150 μm, and a pore volume of 3.61 cm$^3$/g.

The formulations were prepared as follows:

Into an internal mixer, the VISTALON, EVA and SILOX were initially introduced.

The silicas were introduced in a second stage.

The mixer was discharged at 140° C. The resulting composition was extruded (temperature at the extruder head was 150° C.) to form flat profiles.

The modulus, as a function of elongation, is reported in the following Table:

TABLE

| | Modulus in MPa | |
|---|---|---|
| Elongation | Shaped article with $S_1$ | Shaped article with $S_2$ |
| 100% | 4.8 | 3.9 |
| 200% | 5 | 4.1 |
| 300% | 5.6 | 4.7 |
| Elongation at rupture | 680% | 510% |
| Rupture strength | 8 MPa | 6 MPa |

It will be seen that, in thermoplastic type compositions, the silica of the invention appreciably improves the modulus and related properties.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Silica beads having a substantially spherical morphology and a mean particle size of at least 80 μm, a maximum BET specific surface area of 130 m$^2$/g, a fill density in packed state (DRT) of greater than 0.32, and a total pore volume of at least 1.6 cm$^3$/g.

2. Silica beads having a substantially spherical morphology and a mean particle size of at least 80 μm, a maximum BET specific surface area ranging from 100 to 130 m$^2$/g, a fill density in packed state (DRT) ranging from 0.28 to 0.32, a maximum CTAB specific surface area of 130 m$^2$/g, and a total pore volume ranging from 1.6 to 3.3 cm$^3$/g.

3. Silica beads having a substantially spherical morphology and a mean particle size of at least 80 μm, a BET specific surface area of less than 100 m$^2$/g, and a fill density in packed state (DRT) ranging from 0.28 to 0.32.

4. The spherical silica beads as defined by claim 3, having a total pore volume of at least 1.6 cm$^3$/g.

5. The spherical silica beads as defined by claims 1, 3 or 4, having a maximum total pore volume of 3.3 cm$^3$/g.

6. The spherical silica beads as defined by claim 1, having a BET specific surface area of less than 100 m$^2$/g.

7. The spherical silica beads as defined by claim 1, having a fill density in packed state of at least 0.33.

8. The spherical silica beads as defined by claim 7, having a fill density in packed state ranging from 0.33 to 0.37.

9. The spherical silica beads as defined by claims 1 or 3, having a maximum BET specific surface area of 90 m$^2$/g.

10. The spherical silica beads as defined by claims 1, 2 or 3, exhibiting a DOP oil uptake of at most 270 ml/100 g.

11. The spherical silica beads as defined by claim 10, exhibiting a DOP oil uptake of at most 250 ml/100 g.

12. The spherical silica beads as defined by claim 11, exhibiting a DOP oil uptake of at most 215 ml/100 g.

13. The spherical silica beads as defined by claims 1 or 3, having a maximum CTAB specific surface area of 130 m$^2$/g.

14. The spherical silica beads as defined by claim 13, having a maximum CTAB specific surface area of 100 m$^2$/g.

15. The spherical silica beads as defined by claim 14, having a maximum CTAB specific surface area of 90 m$^2$/g.

16. The spherical silica beads as defined by claims 1, 2 or 3, having a mean particle size greater than 100 μm.

17. The spherical silica beads as defined by claim 16, having a mean particle size of at most 300 μm.

18. The spherical silica beads as defined by claim 13, having a BET specific surface area/CTAB specific surface area ratio ranging from 0.9 to 1.2.

19. The spherical silica beads as defined by claims 1, 2 or 3, having a mean particle size greater than 150 μm.

* * * * *